No. 828,038. PATENTED AUG. 7, 1906.
J. E. LORD.
JAR AND JAR CLOSURE.
APPLICATION FILED OCT. 25, 1905.
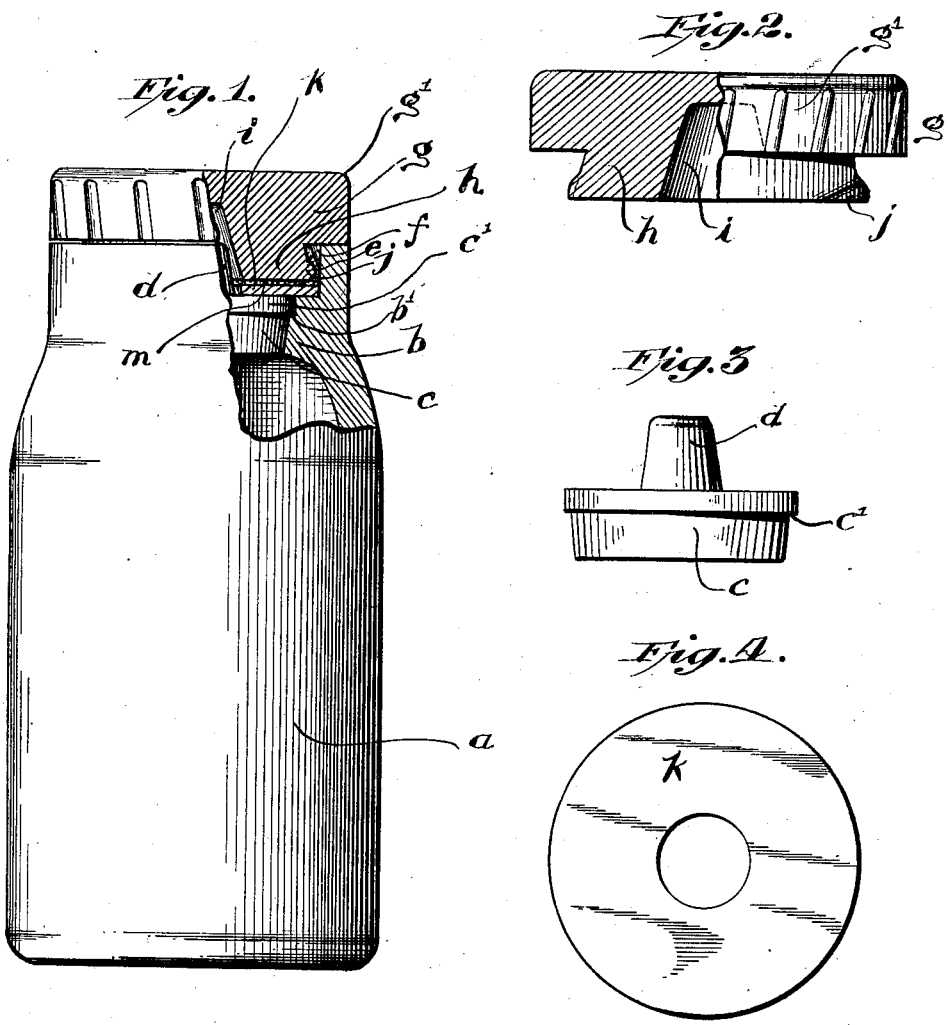
Attest:
Inventor:
Joseph Erwin Lord,
by N. L. Frothingham,
his Atty

UNITED STATES PATENT OFFICE.

JOSEPH ERWIN LORD, OF NORWICH, VERMONT.

JAR AND JAR-CLOSURE.

No. 828,038.　　　Specification of Letters Patent.　　　Patented Aug. 7, 1906.

Application filed October 25, 1905. Serial No. 284,311.

*To all whom it may concern:*

Be it known that I, JOSEPH ERWIN LORD, a citizen of the United States, residing at Norwich, in the county of Windsor and State of Vermont, have invented certain new and useful Improvements in Jars and Jar-Closures, of which the following is a specification, reference being had therein to the accompanying drawings, which form a part thereof.

My invention relates to jars and jar-closures, and more particularly to a class thereof especially adapted for use in the preservation of foodstuffs.

The main object of my invention is to provide a jar and a closure therefor wherein the various parts may be properly sterilized and the jar permanently closed without subjecting the contents thereof to liability of infection from unsterilized parts or to taint through the dissolution of any animal or vegetable composition used in hermetically sealing said jar.

A further object is to provide such a jar which will be simple in design and will not require any nicety in the fitting of the various elements to secure a perfectly-tight and hermetically-sealed closure.

A further object is to dispense with all metallic fittings and rubber or other compressible gaskets and provide a jar which while having a perfectly air-tight closure may be readily opened.

A still further object is to provide a jar-closure which may be used with various processes of sterilizing foodstuffs and be hermetically sealed without likelihood of the contained matter being infected either from bacteria contained on the closure means or otherwise or being rendered unpalatable through the dissolution of any part of said closure means; and a still further object is to provide a jar and closure therefor which may be made of clay and at small expense.

The invention consists, primarily, in the combination of a jar-body having a flanged seat within the neck thereof, a closure-cover adapted to rest upon said seat, a sterilized separator closing the joint or seam between said flange and said cover, a sealing composition covering said cover and said separator and adhering to the neck of the jar, whereby the jar is hermetically sealed, and an outer protecting-cover for said sealing composition, and in such other novel features of construction and combination of parts as are hereinafter set forth and described, and more particularly pointed out in the claims hereto appended.

Referring to the drawings, Figure 1 is an elevation of a jar and closure therefor embodying my invention, one side thereof being broken away and the parts shown in section to disclose the relation of the various parts to each other when the jar is sealed. Fig. 2 is a view of the outer cover, partly in section, detached from the jar-body. Fig. 3 is an elevation of the inner closure-cover, and Fig. 4 is a plan view of the separator similarly detached.

Like letters refer to like parts throughout the several views.

In the embodiment of the invention shown in the drawings, *a* indicates a jar-body, preferably made of clay properly baked and glazed and of any desired size or form. I prefer to employ clay for the reasons chiefly that it is a substance that is found in quantities over a large section of country, that it may be inexpensively molded into form and hardened, that it resists to a material extent climatic changes and changes in temperature and is opaque, thus preventing the penetration of the light and preventing any chemical action within the jar by reason thereof. The neck of said jar is formed with an inwardly-projected flange *b*, rabbeted at *b'* and extending entirely about the inside of said neck a short distance below the top of the jar and forming a seat for the inner cover or closure *c*, the lower edge of which is similarly rabbeted at *c'* to fit the rabbet *b'* and bring the top of said cover substantially flush with the top of the flange *b*. Centrally of the said inner cover or closure *c* is a knob *d*, preferably shaped like the frustum of a cone to facilitate the rotation of the outer cover or closure thereabout in closing and opening the jar, while providing convenient means for placing and removing the inner cover.

The top of the jar is overhung inwardly to form a channel or groove *e* above the flange *b*, one or more ways *f* being formed through said overhung portion, whereby a tongue or bulge on the outer or top cover or closure is permitted to enter said channel or groove. This channel need not be formed with any great degree of accuracy, being through cooperation with the top cover or closure merely auxiliary to the closure of the jar by means of a sealing composition.

The outer top cover or closure *g* comprises a head having a plurality of grooves $g'$, disposed thereabout to afford a gripping surface, and a body $h$, having a central recess $i$, adapted to fit over the knob $d$, and one or more tongues or bulges $j$, adapted to enter the way or ways $f$ and the channel or groove at $e$. This body does not need to fit snugly with relation to the flange $b$, the cover $c$, and its knob $d$, the channel or groove $e$, or the neck of the jar $a$, clearance being required to receive the sealing composition and the separator. The construction heretofore described is not itself designed to seal the jar, being merely for the purpose of protecting, as much as possible, the contents of the jar from the sealing means and said sealing means from the outside agencies and influences which might prove deleterious thereto. The actual sealing is accomplished by means of a separator $k$, comprising a wide ring of cotton duck or other strong clean fabric, which is adapted to pass over the knob $d$ and cover the joint between the inner cover or closure $c$ and the flange $b$, preventing the escape therethrough of the liquors, syrups, or juices within the jar and the contamination of the foodstuffs by contact with and dissolution of the sealing composition. To accomplish the desired end and prevent infection from the separator itself, I render it perfectly impervious to such liquors, syrups, or juices and sterilize its under surface immediately before applying it to the jar by coating it with boiling paraffin or other like neutral agent. The paraffined separator being heated when so applied tends to partly fill said joint with paraffin as well as to protect said joint or seam by the fabric covering. In addition to this separator I employ a sealing agent between the flange $b$, the inner cover $c$, the separator $k$, the walls of the neck of the jar $a$ and the body $h$ of the top cover $g$, which consists of an adhesive composition consisting of rosin, beef-tallow, and fine sawdust, which I do not desire to claim in this connection, the same being made the subject-matter of a distinct application for patent filed on the 25th day of October, 1905, and bearing the serial number 284,312. This composition serves through its adhesive properties when heated and its capacity for rapidly setting and becoming firm and tough when cooled to hold the various parts within the neck of the jar in place, as well as to hermetically seal the jar and protect the contents thereof from contamination through external agencies.

The separator $k$ is disposed between the inner cover or closure $c$ and this sealing composition (shown at $m$) because of the necessity for sterilizing the agent adjacent to the joint or seam about said cover. If it were attempted to run this composition into the neck of the jar at a temperature high enough to destroy the bacteria or germs thereon, the composition in part would penetrate into the body of the jar and through the dissolution of the rosin by the liquors, syrups, or juices taint or flavor the food therein, and in addition would make it possible for openings to form in the composition so applied, resulting in an imperfect seal and the entrance of air, with consequent fermentation.

The herein-described jar is designed for use in preserving various kinds of foodstuffs, and particularly fruits and vegetables. It is requisite that prior to packing or canning such articles the jar itself should be thoroughly sterilized as well as the contents and that the closure should be similarly treated and possess no elements which by dissolution will taint the contained food. In practice when preserving food which may be treated at the higher temperatures the jar-body and its neck and the inner cover $c$ or closure are gradually heated until they may be thoroughly scalded with boiling water for a period sufficient to destroy all bacteria or germs thereon. The foodstuff is then placed in the body of the jar to a point substantially flush with the bottom of the flange $b$ and the sterilized inner cover or closure $c$ placed by means of the knob $d$ in position on said flange. The coöperating rabbets $b'$ and $c'$ on said flange and said cover, respectively, provide a firm support for said cover and leave only a narrow joint or seam between said cover and said flange. Thereafter the separator $k$ is dipped or coated with a brush on its under side with boiling paraffin and placed over the knob $d$, the paraffined side being in contact with the inner cover $c$ and entirely covering and sealing the joint or seam between the said cover and the flange $b$. A quantity of the sealing composition is then reduced to a plastic condition and packed about the edges of and over the separator and about the inside of the neck of the jar, so as to form a solid mass within said neck above said cover, hermetically sealing the jar. The outer cover $g$ before said composition has had opportunity to set is forced within the neck of the jar, the tongue or tongues $j$ entering the way or ways $f$ and being turned in the channel or groove $e$. The bottom and sides of the body $h$, as well as the tongues $j$, are thus so embedded in the sealing composition as to still further pack same and cause it to adhere firmly to all parts of the closure within the neck of the jar and the sides of said neck itself. As said composition cools it sets, and all parts of the closure are thereby held against movement. The outer cover $g$ having been so applied to the jar it is merely necessary to store or place the jar in a fairly cool place to cause the composition to readily and quickly set.

If it be desired to use the jar for preserving foodstuffs which cannot be properly sterilized at the boiling temperature, the food may be placed in the jar after the jar has been properly sterilized by heat and the whole placed in an oven and brought to the temperature required to sterilize the contents, the construction of the jar-body permitting this treatment. The sealing of the jar would in such cases be deferred until it had cooled slightly and would be accomplished as above described. The jar having been so sealed, it may be stored indefinitely under various conditions and climatic changes without liability of the fermentation or deterioration of the contents. The material of the jar resists to a great extent the action of heat, and no part of the closure being liable to destruction at any ordinary temperatures, say up to 150° Fahrenheit, and the composition hermetically sealing the jar being protected from destructive agencies from within the jar by the separator no especial care is required in the storing of the jars to prevent such fermentation. To open the jar, it is merely necessary to apply heat externally of the neck of the jar, as by submerging it in boiling water for a few minutes until the sealing composition at $m$ is again reduced to a plastic condition, and then by turning the outer cover $g$ withdraw it from the channel or groove $e$ through the way or ways $f$ to expose the knob $d$. The cover $c$ may then be raised by means of the knob $d$, bringing with it the separator $k$ and the greater part of the sealing composition within the neck of the jar.

It will be observed that the only parts of the closure which could possibly be brought into contact with the liquor, syrups, or juices or other contents of the jar are prior to their application to the jar sterilized, that the sealing composition hermetically seals the jar, and that the said composition also secures the various parts in position and effects this sealing without employing any expansible parts or any mechanical agency requiring any nicety in the regulation or proportioning of the relative dimensions of the several parts.

It is not my intention to limit the invention to the precise details of construction shown in the accompanying drawings, such details being capable of variation without departing from the spirit and scope of my invention.

Having described my invention, what I claim as new, and desire to have protected by Letters Patent, is—

1. In a jar and jar-closure, the combination of a jar-body, an inwardly-projected flange-seat within the neck thereof, a closure-cover adapted to rest upon said seat, a sterilized separator closing the joint or seam between said flange and said cover, a sealing composition covering said cover and said separator and adhering to the neck of the jar whereby the jar is hermetically sealed, and an outer protecting-cover for said sealing composition.

2. In a jar and jar-closure, the combination of a jar-body, an inwardly-projected flange-seat within the neck thereof, the top of said jar being overhung inwardly to form a channel or groove above said flange, and having vertical ways extending through said overhung portion, a closure-cover adapted to rest upon said seat, a sterilized separator closing the joint or seam between said flange and said closure-cover, a sealing composition covering said cover and said separator and adhering to the neck of the jar whereby the jar is hermetically sealed, and an outer cover comprising a head and a body having a tongue or tongues thereon adapted to enter said way or ways and said channel or groove.

3. In a jar and jar-closure, the combination of a jar-body, an inwardly-projected rabbeted flange-seat within the neck thereof, a closure-cover having its lower edge rabbeted and adapted to rest upon the rabbet in said flange, a knob on the top of said cover, a sterilized separator closing the joint or seam between said flange and said cover, a sealing composition covering said cover and said separator and adhering to the neck of the jar whereby the jar is hermetically sealed, and an outer protecting-cover for said sealing composition.

4. In a jar and jar-closure, the combination of a jar-body, an inwardly-projected rabbeted flange-seat within the neck thereof, a closure-cover having its lower edge rabbeted and adapted to rest upon the rabbet in said flange, a knob on the top of said cover, a sterilized separator closing the joint or seam between said flange and said cover, a sealing composition covering said cover and said separator and adhering to the neck of the jar whereby the jar is hermetically sealed, the top of said jar being overhung inwardly to form a channel or groove above said flange and having vertical ways extending through said overhung portion, and an outer cover comprising a head, and a body having an opening therein adapted to fit over said knob and a tongue or tongues thereon adapted to enter said way or ways and said channel or groove.

5. In a jar and jar-closure, the combination with an inner cover, and a sealing composition hermetically sealing the jar above said cover, of a neutral sterilized separator disposed between said inner cover and said sealing composition, whereby fluid from within said jar is prevented from contacting with said composition.

In witness whereof I have hereunto affixed my signature, this 21st day of October, 1905, in the presence of two witnesses.

JOSEPH ERWIN LORD.

Witnesses:
 E. W. OLDS,
 A. L. DOUGLASS.